US006823980B2

(12) United States Patent
Fujimoto et al.

(10) Patent No.: US 6,823,980 B2
(45) Date of Patent: Nov. 30, 2004

(54) TABLET CONVEYING APPARATUS AND TABLET CUTTING APPARATUS

(75) Inventors: Norioki Fujimoto, Kumagaya (JP); Koji Ono, Gunma (JP); Tetsuo Sakurai, Ota (JP); Motohiko Kosano, Idesaki (JP)

(73) Assignee: Sanyo Electric Co., Ltd., Gunma-Ken (JP)

( * ) Notice: Subject to any disclaimer, the term of this patent is extended or adjusted under 35 U.S.C. 154(b) by 0 days.

(21) Appl. No.: 10/746,428

(22) Filed: Dec. 23, 2003

(65) Prior Publication Data

US 2004/0149100 A1 Aug. 5, 2004

Related U.S. Application Data

(63) Continuation of application No. 09/667,836, filed on Sep. 21, 2000.

(30) Foreign Application Priority Data

Sep. 28, 1999 (JP) ........................................ 11-275233
Nov. 10, 1999 (JP) ........................................ 11-319614
Aug. 11, 2000 (JP) .................................... 2000-245438

(51) Int. Cl.[7] ........................................ B65G 47/24

(52) U.S. Cl. ........................ 198/400; 198/394; 198/406

(58) Field of Search ................................ 198/394, 396, 198/400, 406, 410, 412, 413, 416

(56) References Cited

U.S. PATENT DOCUMENTS 4,838,407 A * 6/1989 Komuro ..................... 198/406
5,499,708 A * 3/1996 Gorecki et al. ............. 198/400
5,826,696 A * 10/1998 Rupp et al. ................. 198/396
5,857,672 A * 1/1999 Fowler et al. .............. 198/412
6,253,902 B1 * 7/2001 Saito et al. ................. 198/396

FOREIGN PATENT DOCUMENTS

GB 2214500 A * 9/1989 ........... B65G/47/24
JP 5-319553 * 12/1993 ........... B65G/47/30

* cited by examiner

*Primary Examiner*—James R. Bidwell
(74) *Attorney, Agent, or Firm*—J.C. Patents

(57) ABSTRACT

A tablet conveying and cutting apparatus capable of adjusting the position of a tablet is a structure suitable for downsizing. A tablet conveying and cutting apparatus has an arranging device for arranging a long side of the tablet to be perpendicular to the tablet's moving direction by moving the tablet for a predetermined distance; and an oblique plate for making the tablet fall a predetermined distance.

1 Claim, 22 Drawing Sheets

TABLET CONVEYING APPARATUS AND TABLET CUTTING APPARATUS

CROSS-REFERENCE TO RELATED APPLICATION

This application is a continuation of U.S. application Ser. No. 09/667,836, filed on Sep. 21, 2000.

BACKGROUND OF THE INVENTION

1. Field of Invention

The present invention relates to a tablet conveying apparatus capable of adjusting the tablet position and a tablet cutting apparatus.

2. Description of Related Art

In past, in hospital and pharmacy tablets are provided to patients according to prescriptions. When one tablet is overdosage or it is hard for a patient to swallow one tablet, this tablet then has to be cut in half or more for example. For such circumstance, cutting a tablet directly by hand is the simplest and fast way. Therefore, a cutting groove is formed on the tablet. In addition, a cutter for cutting tablets is also disclosed by Japanese gazette of JP 6-41546.

Due to that cutting tablets by hand is not very efficient and economic in practice, an automatic tablet cutting machine is disclosed by Japanese gazette of JP 3-114241 and JP 2-29257.

However, the cutting machine uses a belt to retain the tablet and convey to a rotary blade (or a cutter capable of moving up and down), and then a circular tablet as shown in FIG. 10C is cut. The automatic tablet cutting machine is designed only for the circular tablet rather than for oval or rectangular tablets. For example, a tablet shown in FIGS. 10B and 10C cannot be cut by the automatic tablet cutting machine.

Namely, the tablet cannot be stably retained by the belt if the tablet is oval or rectangular and the long side of the tablet can not be kept in one direction. Therefore, the relative position between the tablet and the cutter is not well defined when the tablet is conveyed to the cutter. And it is hard to equally cut the tablet in half.

The present invention can adjust the position of the tablet as shown in FIG. 10C and a tablet conveying and cutting apparatus capable of adjusting the position of the tablet is provided.

Furthermore, a machine capable of adjusting the position of the tablet and conveying the tablet for examining the tablet is also disclosed (such as JP 7-201644). However, the machine uses an industrial conveying belt for transporting the belt and it is only suitable for large equipments of a factory. Therefore, the proposed machine is not suitable for an automatic cutting machine for a pharmacy.

SUMMARY OF THE INVENTION

The present invention provides an automatic tablet cutting machine suitable for a pharmacy. Namely, no matter what kind of shape the tablet is, the position of the tablet can be adjusted and arranged, and then conveyed to a cutting location for cutting the tablet.

The present invention provides a tablet conveying apparatus for adjusting position of a tablet, which comprises an arranging device for arranging a long side of the tablet to be perpendicular to the tablet's moving direction by moving the tablet for a first predetermined distance; and an oblique plate for making the tablet fall a second predetermined distance.

The present invention further provides a tablet cutting apparatus for cutting a tablet at a predetermined location. The tablet cutting apparatus comprises a blade for cutting the tablet; an arranging device for arranging a long side of the tablet to be perpendicular to the tablet's moving direction by moving the tablet for a predetermined distance; an oblique plate for making the tablet arranged arranging device by the to fall along the oblique plate; a shutter for stopping the tablet fallen from the oblique plate; a retainer device for retaining the tablet from the long side of the tablet stopped by the shutter; and a conveying device for conveying the tablet adjusted by the retainer device to a cutting location.

The blade mentioned above can be a rotary blade or a cutter capable of moving up and down. The conveying device further comprises a rotary roller and a resilient plate. The rotary roller further comprises a groove formed on the center of the circumstance of the rotary roller corresponding to the blade, and a rugged surface formed symmetrically with respect to the groove on the circumstance of the rotary roller. In addition, the arranging device comprises a pushing plate for pushing the tablet to move forwards.

The arranging device can also comprise a pushing plate for pushing the tablet to move along an arc path. Moreover, the arranging device can comprise a pushing plate for pushing the tablet to move along an arc path; and a baffle plate for radially applying a force on the front end of the tablet while the baffle plate is contact with the front end of the tablet.

The present invention further provides a A tablet cutting apparatus for cutting a tablet at a predetermined location, which comprises a rotary blade for rotationally cutting the tablet; an arranging device for arranging a long side of the tablet to be perpendicular to the tablet's moving direction by moving the tablet for a predetermined distance; a retainer device for retaining the tablet arranged by the arranging device from the long side of the tablet such that the position of the tablet is coincident with a location corresponding to the rotary blade; and a conveying device for conveying the tablet adjusted by the retainer device to the location of the rotary blade.

According to the present invention, the long side of the tablet is perpendicular to its moving direction, and the retainer device retains the ends of the long side of the tablet under such a state. While the tablet is located at a location corresponding to the rotary blade, the tablet is conveyed by a conveying device to the rotary blade for cutting. Therefore, such as an oval tablet or even though a non-circular tablet can be correctly modified its position and then conveyed to the rotary blade.

In addition, comparing with cutting by pressure, because the rotary blade 36 can cut the tablet M safely and credibly, the tablet M can be correctly and shape-irrelevantly cut in half.

The present invention further provides a tablet cutting apparatus for cutting a tablet at a predetermined location. The apparatus comprises a rotary blade for rotationally cutting the tablet; an arranging device for arranging a long side of the tablet to be perpendicular to the tablet's moving direction by moving the tablet along an arc channel; a position modification device for further modifying the position of the tablet fallen from the arranging device such that the long side of the tablet is perpendicular to the tablet's falling direction; a retainer device for retaining the tablet rearranged by the position modification device from the long side of the tablet such that the position of the tablet is coincident with a location corresponding to the rotary blade; and a conveying device for conveying the tablet adjusted by the retainer device to the location of the rotary blade using a rotary roller and resilient plates, wherein a force applied on the tablet during cutting is similar to that applied to the rotary roller and is for setting a relative position of the rotary blade and the conveying device and a rotational direction of the rotary blade.

A position modification device is further installed for modifying the long side of the tablet fallen from the arrange device to be perpendicular to the falling direction. Therefore, even though the long side of the tabled is not arranged to be perpendicular to its moving direction, the position modification device can further actually and correctly rearrange the position of the tablet.

Furthermore, the tablet is retained by the retainer roller and the supporting resilient plate and then moved to the location of the rotary blade. Because the force applied on the tablet during cutting is similar to the force applied to the rotary roller and is for setting the relative position of the rotary blade and the retainer roller, therefore no extra force is applied on the tablet or rotary blade. The tablet can be smoothly and correctly cut.

In addition, the present invention further provides a tablet cutting apparatus for cutting a tablet at a predetermined location. The tablet cutting apparatus comprises a blade for cutting the tablet; a tablet case for providing the tablet; an arranging device for arranging a long side of the tablet to be perpendicular to the tablet's moving direction by moving the tablet for a predetermined distance; an oblique plate for making the tablet arranged by the arranging device to fall along the oblique plate; a shutter for stopping the tablet fallen from the oblique plate and further rearranging the position of the tablet; a retainer device for retaining the tablet from the long side of the tablet stopped by the shutter such that the position of the tablet is coincident with a location corresponding to the rotary blade; a conveying device for conveying the tablet adjusted by the retainer device to a cutting location; and a position changing device installed along a falling path of the tablet out of the tablet case.

Moreover, the present invention provides a tablet cutting device, which comprises a blade for cutting the tablet; an arranging device for arranging a long side of the tablet to be perpendicular to the tablet's moving direction by moving the tablet for a predetermined distance; an oblique plate for making the tablet arranged by the arranging device to fall along the oblique plate; a shutter for stopping the tablet fallen from the oblique plate and further rearranging the position of the tablet; a retainer device for retaining the tablet from the long side of the tablet stopped by the shutter such that the position of the tablet is coincident with a location corresponding to the rotary blade; and a conveying device for conveying the tablet adjusted by the retainer device to a cutting location, wherein the retainer device is expanded within a range for guiding the tablet before the conveying device is driven.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Accompanying with the drawings, follows are detailed descriptions of a tablet conveying and cutting apparatus of the present invention.

Figure 1:
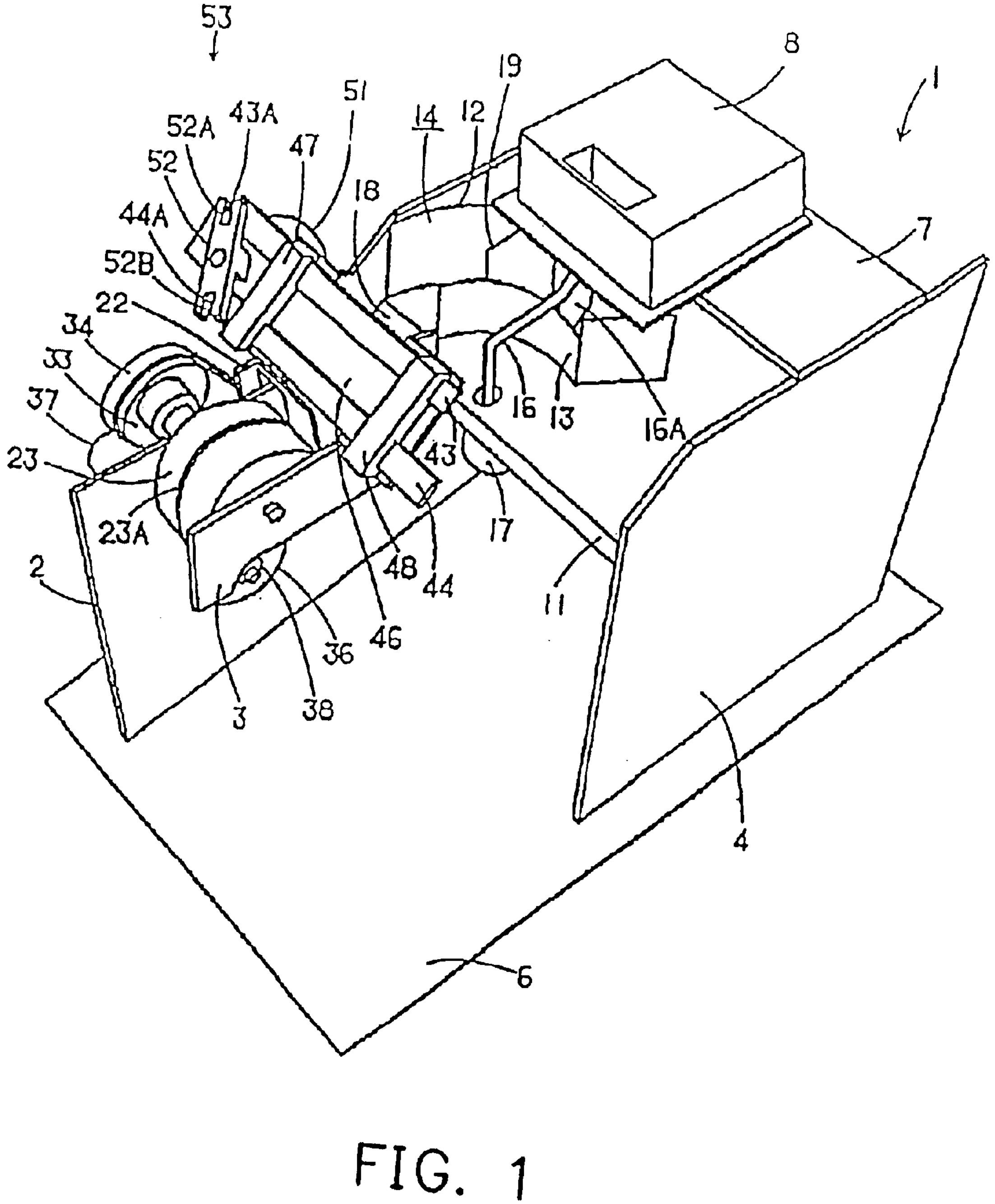
FIG. 1 shows a perspective view of a tablet cutting apparatus according to the first embodiment of the present invention.
Figure 2:
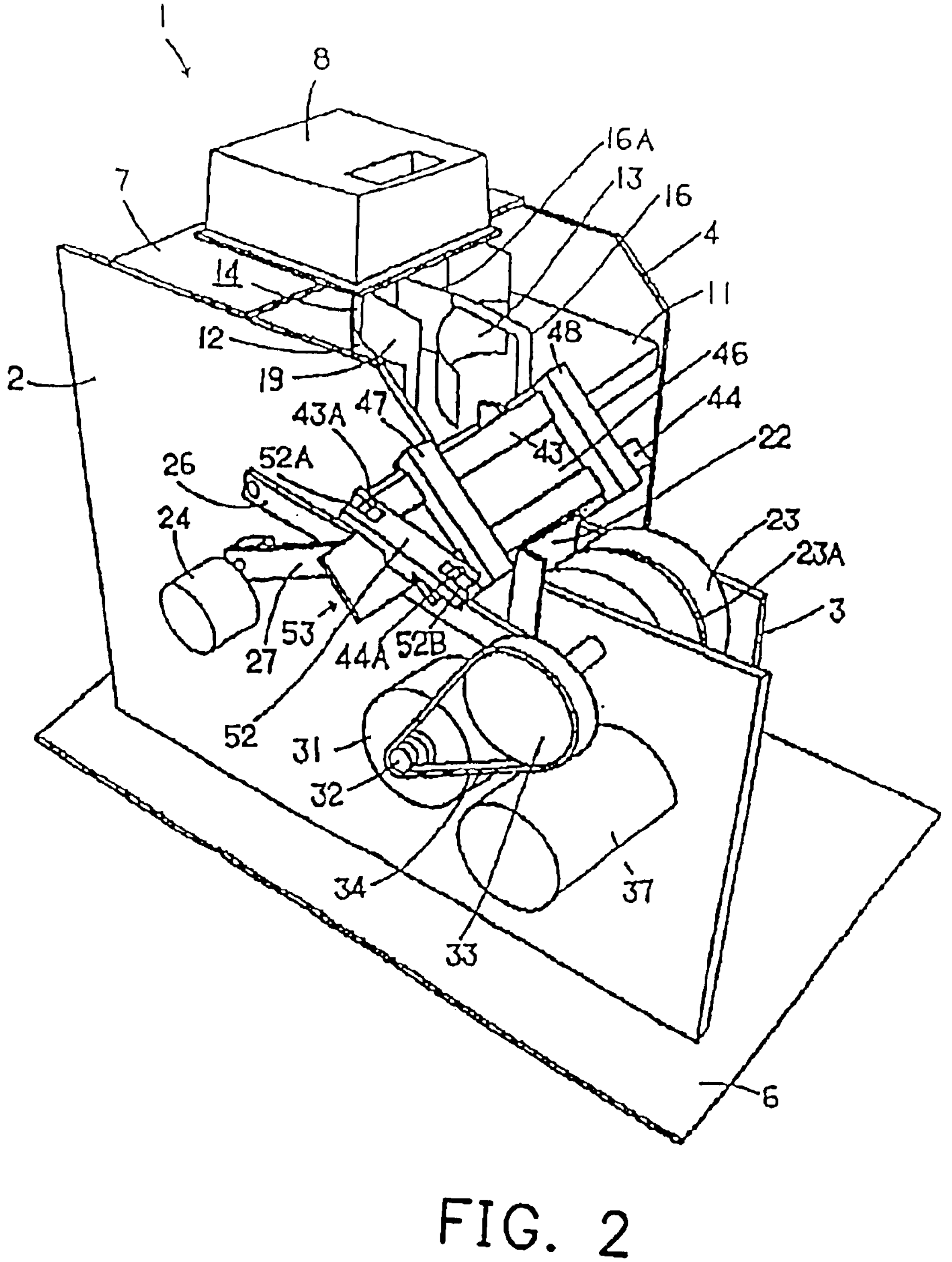
FIG. 2 shows another perspective view of the of the tablet cutting apparatus according to the first embodiment of the present invention.
Figure 3:
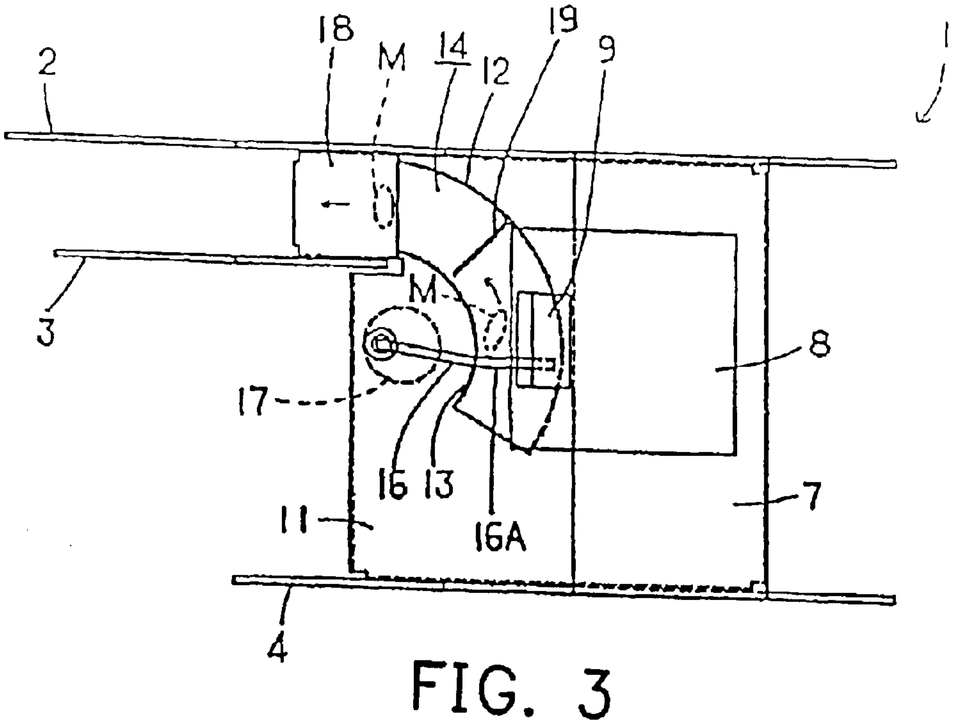
FIG. 3 is a schematic top view of the of the tablet cutting apparatus according to the first embodiment of the present invention.
Figure 11:
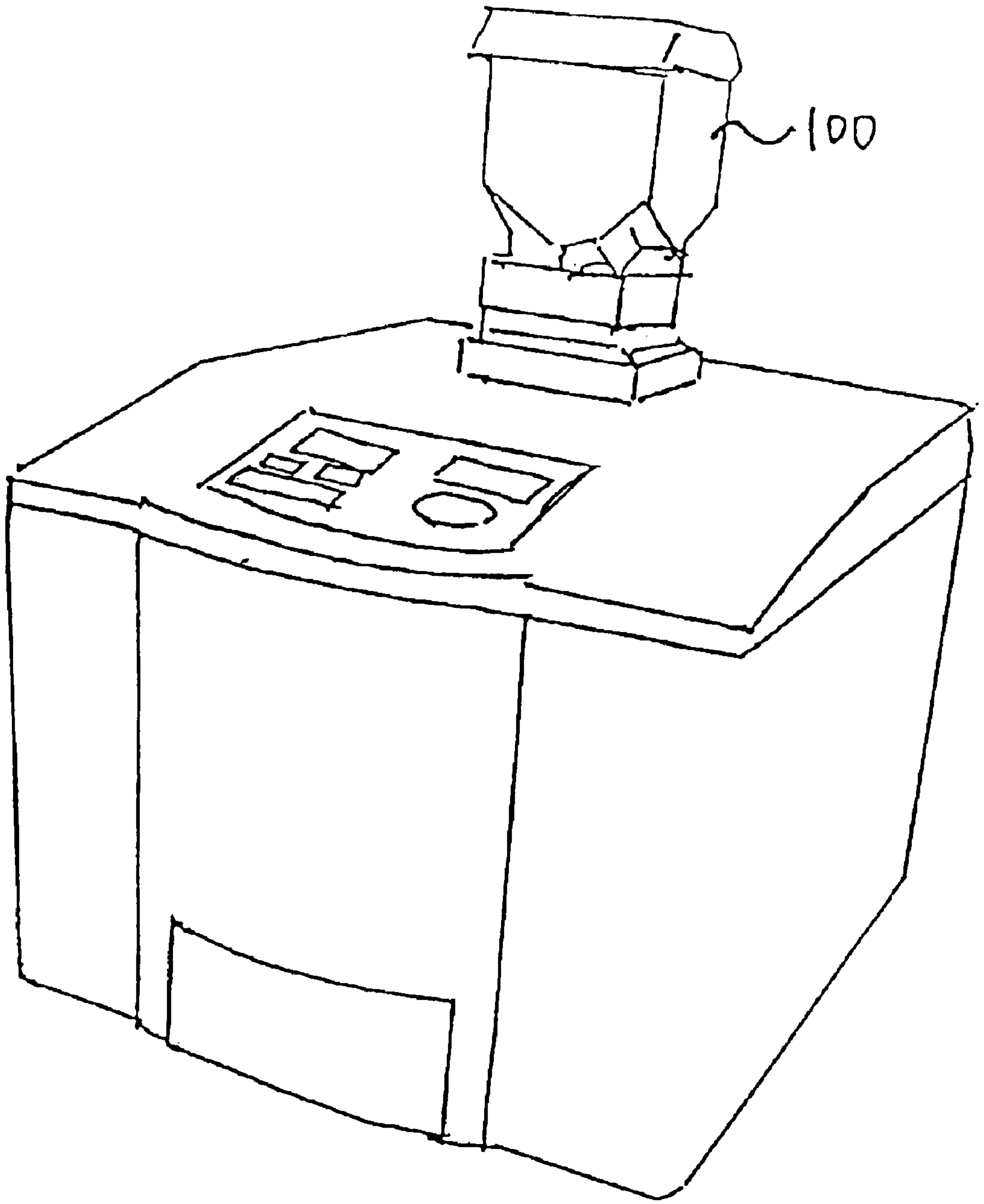
FIG. 11 shows a schematic overall view of the tablet cutting apparatus shown in FIG. 1.

FIG. 11 schematically shows a perspective view of the tablet conveying and cutting apparatus according to one preferred embodiment of the present invention. FIGS. 1 and 2 are perspective views after the housing of the tablet conveying and cutting apparatus shown in FIG. 11 is removed. And, FIG. 3 schematically illustrates a top view of the drawings shown in FIGS. 1 and 2.

In FIG. 11, a tablet case 100 is used for containing tablets, and a tablet feeder is further installed on the tablet case 100 for feeding tablets into the tablet conveying and cutting apparatus, which are described in detail as followings.

FIG. 1 through FIG. 4 respectively show various views from different view points, which are used for explaining structure and operations of the tablet conveying and cutting apparatus, of the present invention.

Basically, the main body of the tablet conveying and cutting apparatus 1 of the present invention is constructed of three plates 2, 3 and 4, a bottom plate 6 and a top plate 7, which is substantially a box-shaped structure. The tablet feeder 8 is installed on the top plate.

Arc-shaped channel walls 12, 13 are form on a horizontal plate 11 underneath the top plate 7. The channel walls 12, 13 are centered at the same point and placed with a predetermined spacing, and therefore a channel 14 is formed therebetween. One end of the channel 14 is located under the baffle plate 9 installed on the bottom of a shoot portion of the tablet feeder 8, while the other end is extended to the plates 2, 3. In addition, the baffle plate 9 is an optional element, which has no influence on the overall operation if it is not installed.

A rotary arm 16 is driven by a rotary arm motor 17 installed underneath the horizontal plate 11, which rotation center is the same as the center of the arcs of the channel walls 12, 13 mentioned above. In addition, a pushing plate 16A is mounted on the end of the rotary arm 16 and is freely moved along the channel 14. The area of the pushing plate 16A is substantially the same as the cross-sectional area of the channel 14. The pushing armed can be rotated due to the rotation of the rotary arm motor 17, and therefore the rotary arm is moved from one end to the other end of the channel 14 with a constant speed.

An oblique plate (position modification device) 18 is installed between the plates 2, 3, in which one end of the oblique plate is connected to the end of the channel 14 and the oblique plate is oblique downwards. A second baffle plate 19 is further assembled within the channel 14 between the oblique plate 18 and the baffle plate 9. The second baffle plate 19 is rotationally mounted on the channel wall 12 and extended towards the center of the arc formed by the channel wall 12. The second baffle plate 19, for example, is made of flexible and resilient material. The channel walls 12, 13, channel 14, rotary arm 16 and the second baffle plate 19 form a so-called arranging device. Moreover, the second baffle plate 19 can, for example, be made of iron, which is mounted on the channel wall 12 and capable of freely rotating. The second baffle plate 19 is mounted on the channel wall 12 using a resilient element, such as a spring, and is protruded towards the arc center of the channel wall 12.

A supporting resilient plate 21 is installed between the plates 2, 3. The supporting resilient plate 21 is connected to the lower end of the oblique plate 18 with the same grade and is further bent and extended in horizontal. In addition, a shutter 22 is installed on the supporting resilient plate 21. A retainer roller (rotary roller) 23 is formed located under and behind the shutter 22. The retainer roller 23 is supported and freely rotated between the plates 2, 3 and further located above the supporting resilient plate 21.

The shutter 22 mentioned above is connected to a shutter motor 24 installed on opposite side of the plate 2 through cranks 26, 27. Accordingly, a crank structure consisted of the cranks 26, 27 is capable of moving up and down while the shutter motor rotates.

In addition, the retainer roller 23 is connected to a roller motor 31 installed on opposite side of the plate 2 through a small pulley 32, a large pulley 33 and a belt 34. Due to the rotation of the roller motor 31, the retainer roller 23 is rotated clockwise with respect to FIG. 4 at a decreased low speed. The retainer roller 23 and the supporting resilient plate 21 form a conveying device.

A rotary blade 36 is installed under the retainer roller 23 and the supporting resilient plate 21. The rotary blade is mounted on a rotational shaft of a rotary blade motor 37 installed on the opposite side of the plate 2 by a fixer 38 and located under the midst between the plates 2, 3. The rotary blade 36 is rotated counterclockwise with respect to FIG. 4 when the rotary blade motor is rotated.

Grooves 23A, 21A are respectively formed at the center of the circumstances of the retainer roller 23 and supporting resilient plate 21 and formed up and down at corresponding locations. The upper portion of the rotary blade 36 is capable of passing through the grooves 21A, 23A and reaches within the retainer roller 23, by which the rotary blade 36 has no interference with the retainer roller 23 and the supporting resilient plate 21. Furthermore, a reception dish 54 is assembled underneath the rotary blade 36.

A pair of retainer plates 41, 42 (retainer device) are formed at left and right with respect to the oblique plate 18 and the supporting resilient plate 21. The retainer plates 41, 42 are respectively fixed on sliding plates 43, 44 and the sliding plates 43, 44 are assembled between a base plate 46, and holding-down plates 47,48. Accordingly, the sliding plates 43, 44 are capable of moving left and right. As shown, the retainer plates 41, 42 are therefore formed on a bottom surface of the base plate 46 and the sliding plates 43, 44 are formed on the top surface of the base plate 46. The retainer plates 41, 42 are connected to the sliding plates 43, 44 through openings 46A, 46B on the base plate 46.

Pins 43A, 44A are further respectively mounted on the left ends of the sliding plates 43, 44. Each of the pins 43A, 44A are rotationally and movably received within grooves 52A, 52B on the two ends of a rod 52 connected to a shaft of a retainer plate motor 51 installed on the bottom surface of the base plate 46. The retainer plates 41, 42, the sliding plates 43, 44, the base plate 46, the holding-down plates 47, 48, the retainer plate motor 51 and the rod 52 form a retainer structure.

Figure 6:
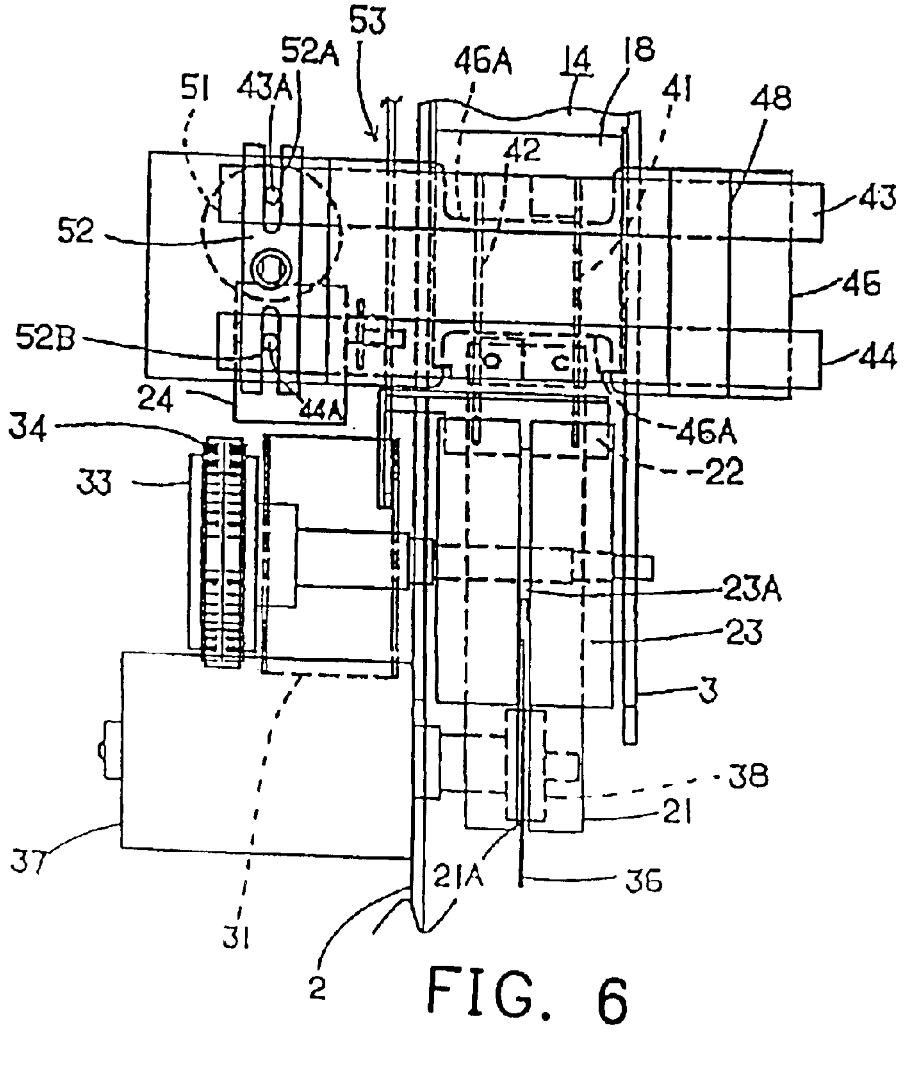
FIG. 6 shows a detailed front view of the retainer device.
Figure 7:
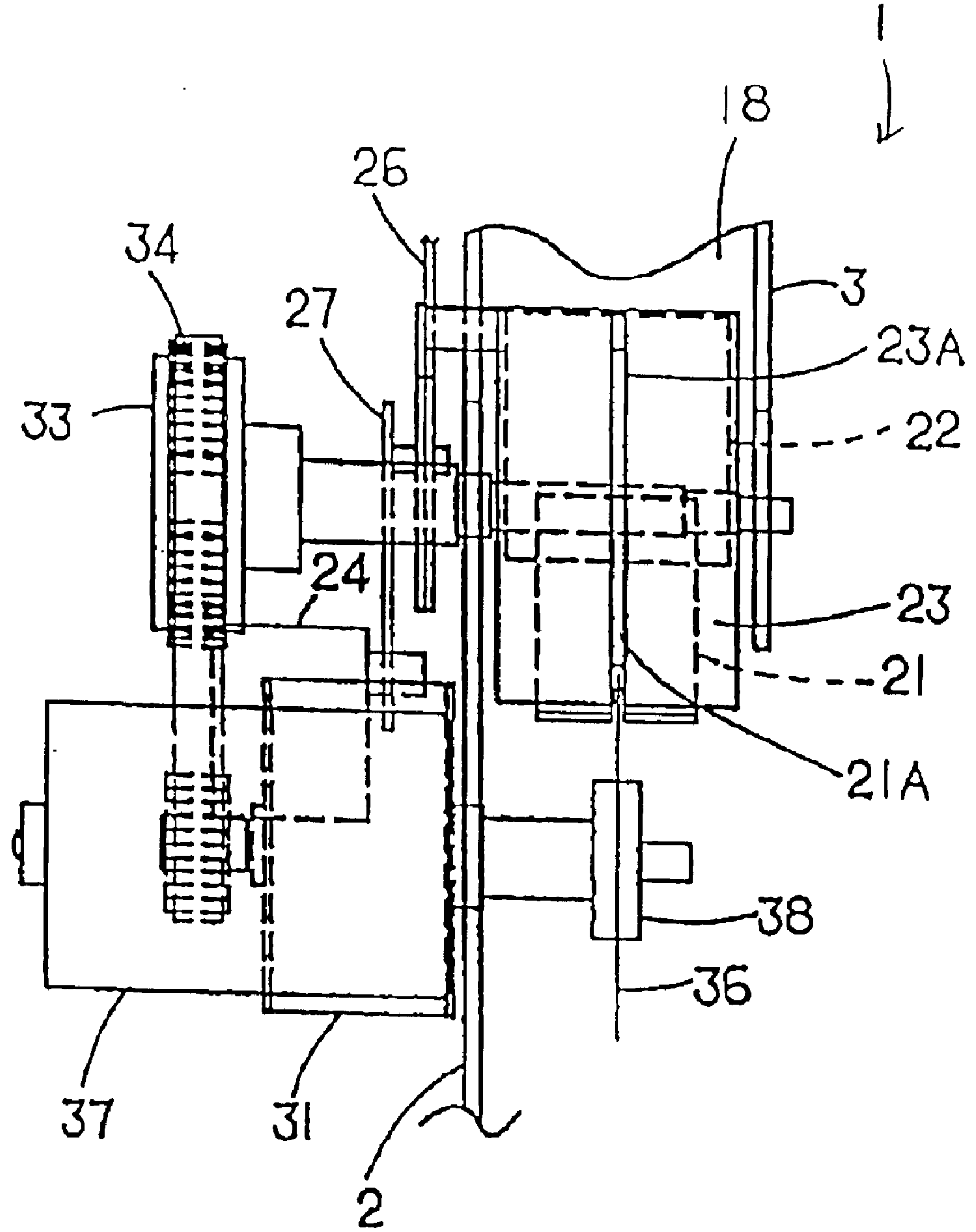
FIG. 7 shows a detailed front view of the rotary roller and the rotary blade according to the first embodiment of the present invention.

As described above, as the retainer plate motor 51 rotates, the rod 52 is then rotated clockwise with respect to FIG. 6. Accordingly, the sliding plate 43 is moved right with respect to FIG. 6, while the sliding plate 44 is moved left, causing the retainer plates 41, 42 are to be moved apart. In contrast, if the retainer plate motor 51 rotates reversely, the rod 52 is then rotated counterclockwise with respect to FIG. 6. The sliding plate 43 is moved left with respect to FIG. 6, while the sliding plate 44 is moved right, causing the retainer plates 41, 42 are to be moved toward each other. The central line of the retainer plates 41, 42 is usually coincident to that of the plates 2, 3.

The rotary arm motor 17, the shutter motor 24, the retainer roller motor 31 and the retainer plate motor 51 are step motors, and the rotary blade motor 37 is a DC (direct current) motor, for example, and are all controlled by a control device (not shown).

The operations based on the foregoing structure are described and discussed in detail. When an elliptical (oval) or long-circular tablet is drained piece by piece from the shoot of the tablet feeder 8, the drained (or processed) tablet M is blocked by the baffle plate 9. The direction or position of the tablet M is changed and then the tablet M falls on the channel 14. The control device then drives the rotary arm motor 17 such that the rotary arm 16 is rotated counterclockwise with respect to FIG. 3.

Accordingly, the pushing plate 16A on the rotary arm 16 pushes the tablet M to move to hit the baffle plate 19. Due to the pushing force, the position of the tablet is changed along the surface of the pushing plate 16A such that the long side of the tablet is perpendicular to the tablet's moving direction.

The tablet M pushed by the pushing plate 16A is then contact with the baffle plate 19 which tip portion is expanded and deformed due to the resilience of the baffle plate 19 itself. The reaction of the baffle plate 19 is then experienced on the tablet M as an oblique force. A rotational momentum is therefore created by the vector sum of the reaction force of the baffle plate 19 and the pushing force of the pushing plate 16A, causing that the long side of the tablet is perpendicular to the tablet's moving direction.

The tablet M almost reaches the oblique plate 18 after passing the baffle plate 19, and then falls along the oblique plate 18, during which the long side of the tablet is credibly perpendicular to the tablet's moving direction.

Moreover, the retainer plates 41, 42 are separated from each other, the tablet is thus sliding downwards between the retainer plates 41, 42. Afterwards, the rotary arm 16 is rotated clockwise with respect to FIG. 3 and then returned to a predetermined standby position. Furthermore, the tablet M sliding downwards on the oblique plate 18 is blocked by the shutter 22 because the shutter 22 is closed at this time.

When the tablet M is blocked and stopped by the shutter 22, it is not necessary that the center of the tablet M must be coincident with the center line of the plates 2, 3. The control device first drives the shutter motor 24 for raising the shutter 22 by the cranks 26, 27, and then the retainer motor 51 is driven to move the retainer plates 41, 42 to move towards each other. The two ends of the long side of the tablet M are then respectively retained by the retainer plates 41, 42 when the center of the tablet M is coincident with the center line of the plates 2, 3.

Under such a circumstance, the long side of the tablet M is perpendicular to its moving direction and the center of the tablet M is located on the center line of the plates 2, 3, i.e., the center of the tablet M is located on an extension line of the rotary blade 36.

The control device then drives the roller motor 31 such that the retainer roller 23 is rotated slowly, and at the same time, which the rotary blade 36 still runs, the retainer motor 51 is driven to separate the retainer plates 41, 42.

Figure 4:
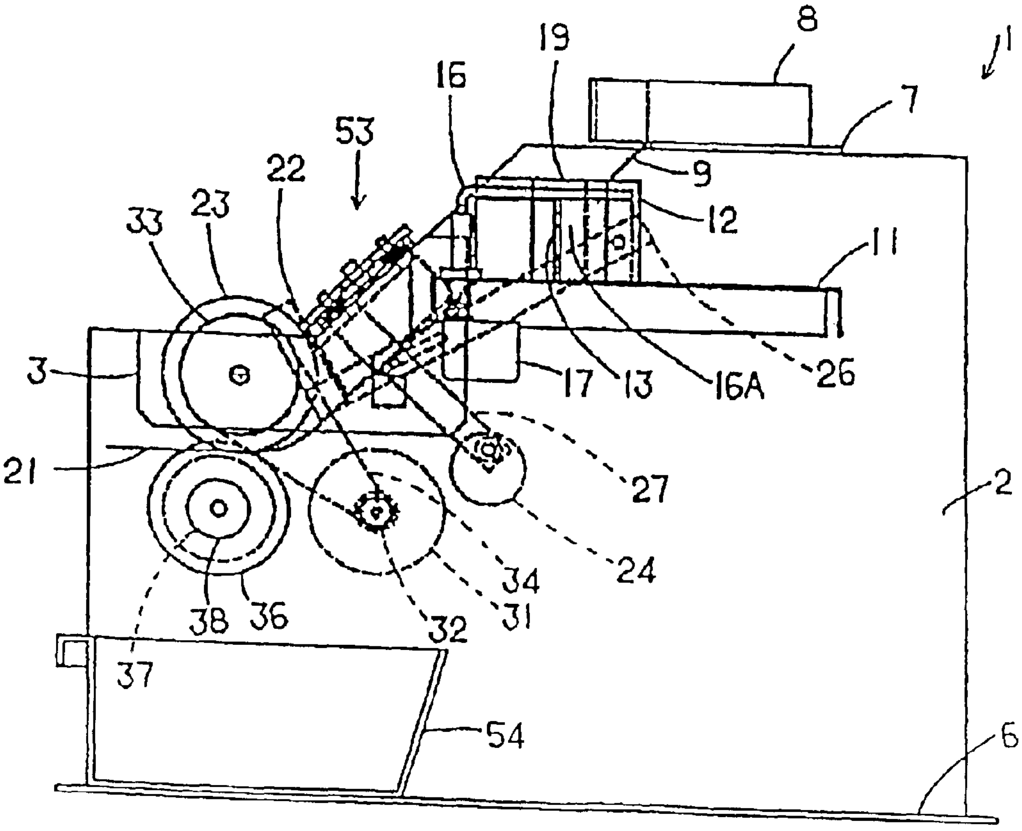
FIG. 4 is a schematic side cross-sectional view of the of the tablet cutting apparatus according to the first embodiment of the present invention.
Figure 5:
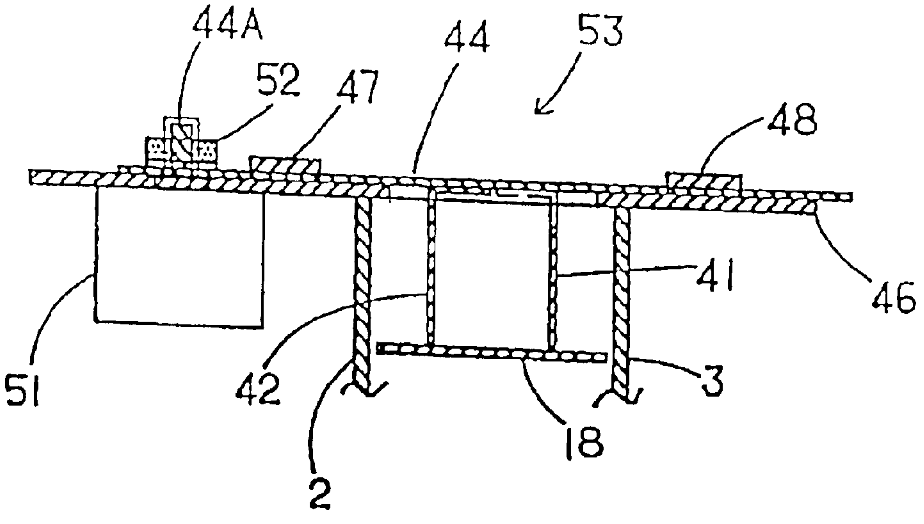
FIG. 5 is a schematic cross-sectional view of the retainer device.

After the tablet M reaches the retainer roller 23, the tablet M is resiliently retained up and down by the retainer roller 23 and the supporting resilient plate 21 and then moves slowly to the left with respect to FIG. 4. Namely, the tablet M moves towards the rotary blade 36. While the tablet M reaches the rotary blade 36, the tablet M can be correctly and equally cut in half from its center because the center is consistent with the rotary blade 36. Afterwards, the two half-cut tablets are further conveyed by the retainer roller 23 and then fall to the reception dish 54.

The thickness of the tablet M is absorbed because of the deformation of lower part of the supporting resilient plate 21. Moreover, the rotary blade 36 rotates within the grooves 21A, 23A and the tablet M is cut by the rotary blade 36 under the condition of being retained at the retainer roller 23, the force is thus acted on the retainer roller 23 rather than the supporting resilient plate 21.

According to the present invention, the rotary arm 16 makes the tablet M move within the channel 14 such that the long side of the tablet M is perpendicular to its moving direction. The ends of the long side of the tablet M are retained by the retainer plates 41, 42. After the center of the tablet M is changed to be corresponding to the rotary blade 36, the retainer roller 12 conveys the tablet M to the rotary blade 36 for cutting the tablet M. Therefore, the position of the tablet M with the oval or rectangular shape, even other than circular shape, can be more definitely consistent with the location of the rotary blade 36 during conveying to the blade 36.

In addition, comparing with cutting by pressure, because the rotary blade 36 can cut safely and credibly the tablet M, the tablet M can be correctly cut in half.

In particular, because when the long side of the tablet M is modified to be perpendicular to its falling direction during falling down the oblique plate 18, therefore even though the long side of the tablet M is not perpendicular to its moving direction, it can be still actually modified while the tablet M falls down to the oblique plate 18.

The tablet M is retained by the retainer roller 23 and the supporting resilient plate 21 and then moved to the location of the rotary blade 36. Furthermore, because the force applied on the tablet M during cutting is similar to the force applied to the retainer roller 23 for setting the relative position of the rotary blade 36 and the retainer roller 23, therefore no extra force is applied on the tablet M or rotary blade 36.

Figure 8:
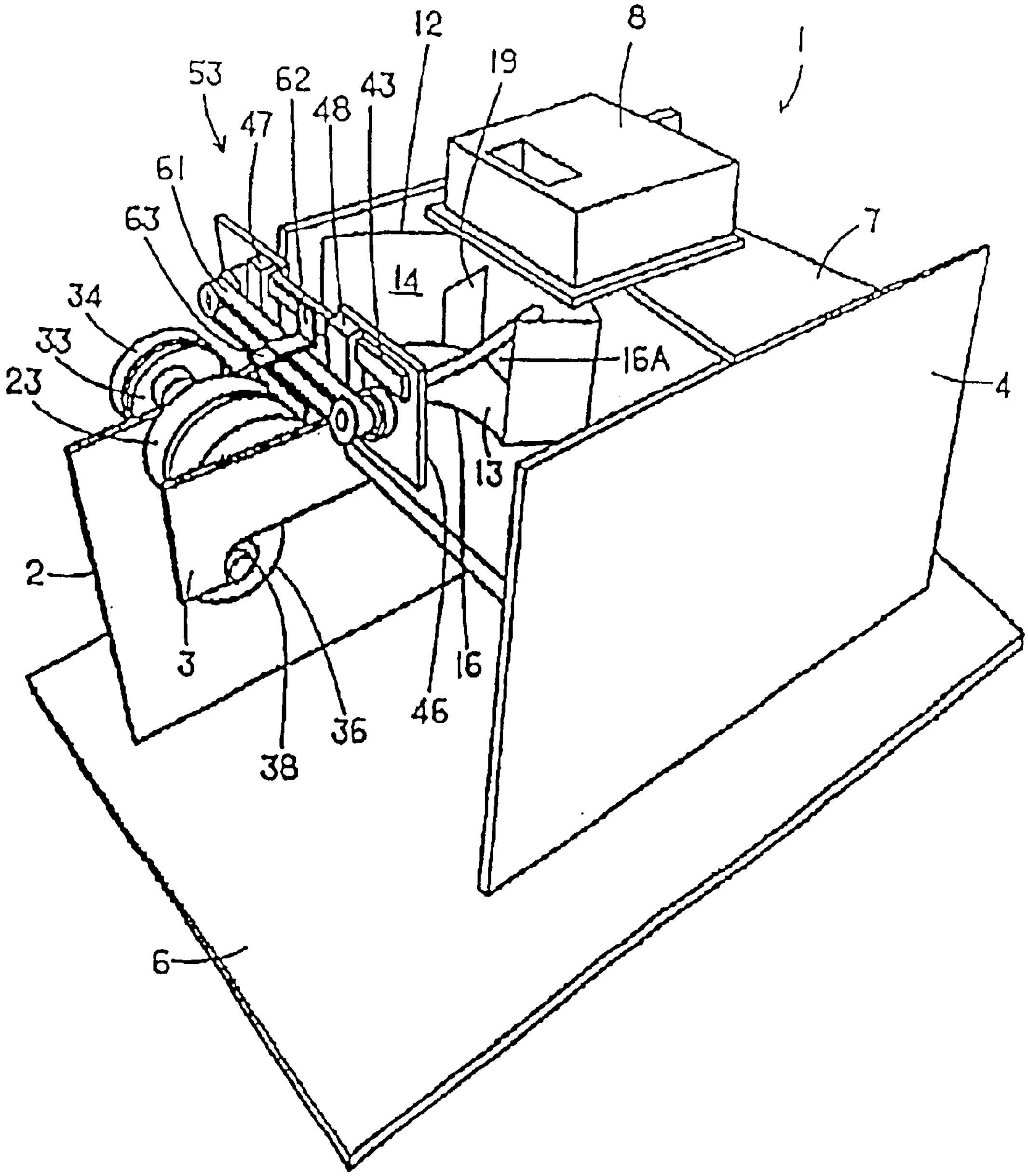
FIG. 8 shows a perspective view of a tablet cutting apparatus according to the second embodiment of the present invention.
Figure 9:
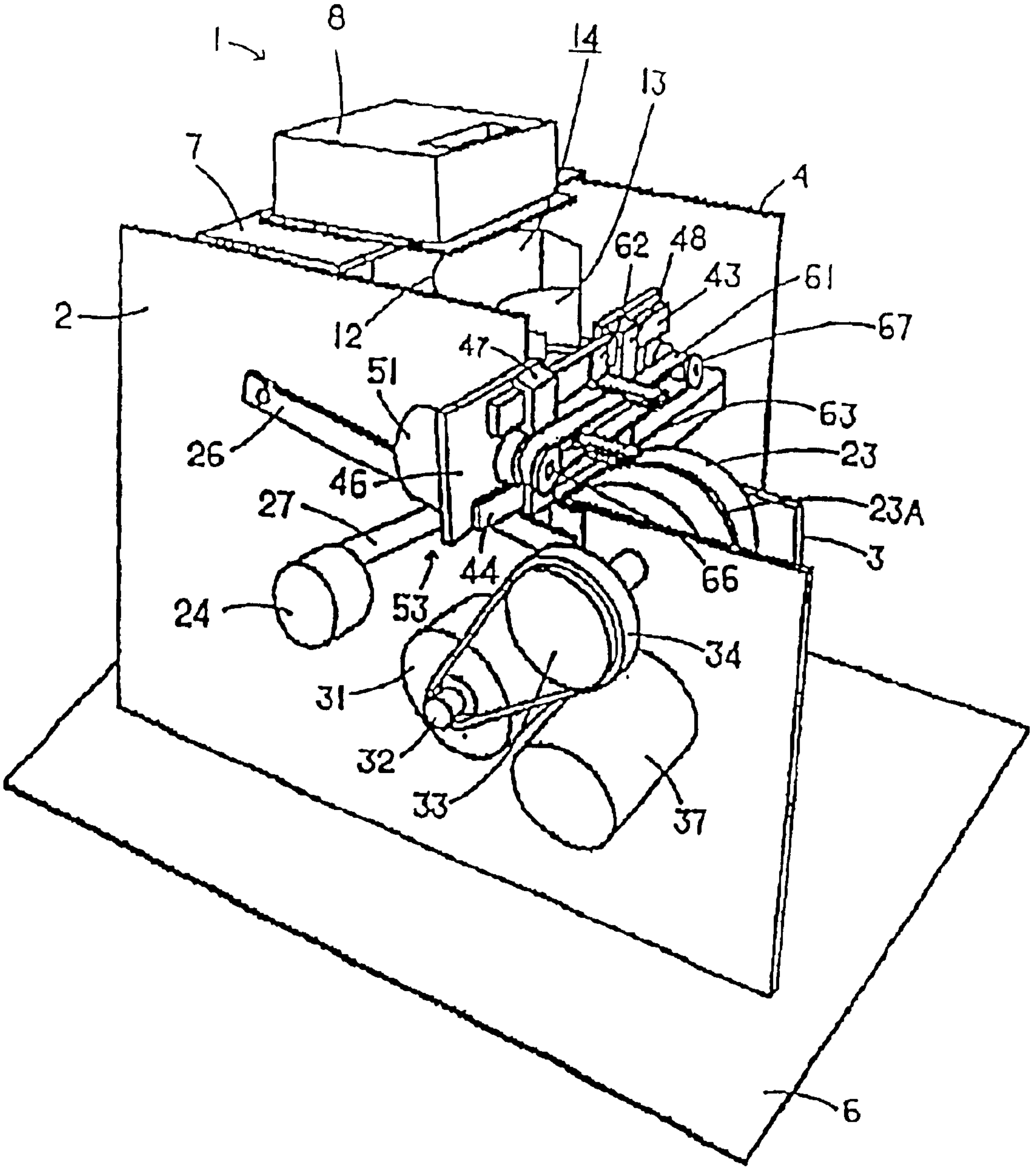
FIG. 9 shows another perspective view of the of the tablet cutting apparatus according to the second embodiment of the present invention.
Figure 10A:
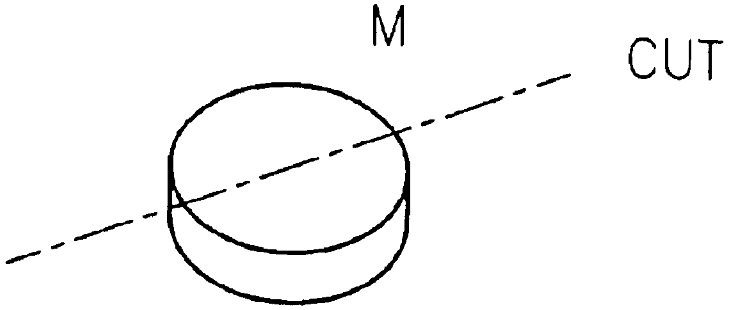
FIGS. 10A~10C show various cutting ways for cutting a tablet.
Figure 10B:
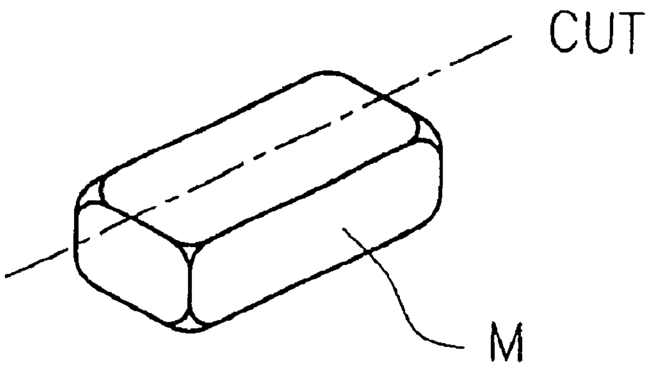
Figure 10C:
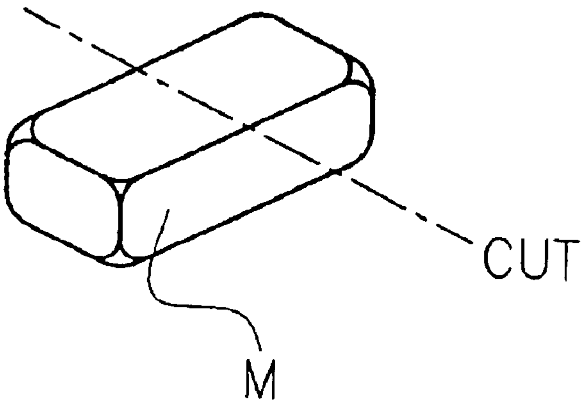

As discussion of the foregoing embodiment, the retainer plates 41, 42 are driven to be moved toward each other or apart by the crank structure consisting of the sliding plates 43, 44, the pins 43A, 44A and the rod 52. However, it is not the only structure applied to the present invention. For example, as shown in FIGS. 8 and 9, a conveying belt 61 is installed from the left to the right of the base plate 46 through a pulley 66 mounted on the retainer motor 51 and a pulley 67 on the other end of the base plate 46. Through a link plate 62, the sliding plate 43 is fixed on a forward path of the conveying belt 61 and the sliding plate 44 is fixed on a backward path of the conveying belt 61. The items having the same numerals shown in FIGS. 1 through 7 represent the same elements.

As described above, due to the clockwise and counter-clockwise rotations of the retainer motor 51, the conveying belt 61 can convey along the forward or backward path such that the sliding plates 43, 44 can operate as the crank structure. Furthermore, the conveying belt can be replaced by gears and then the same operations can be achieved. In the embodiment, the base plate 46 is assembled vertically, which can further reduce the distance of the oblique plate 18 by comparing with the previous embodiment. Therefore, as the distance of the oblique plate 18 is reduced, the falling distance down to the oblique plate 18 of the tablet m can be also reduced.

Furthermore, in these embodiments, oval tablet is used to explain the operation, but in general the circular tablet can be cut equally in half from it center in the way and no further description is made for this.

Referring to FIGS. 12 through 17, another preferred embodiments is described that the baffle plate 19 is made of iron, in which the items having the same numerals shown in FIGS. 1 through 7 represent the same elements.

Figure 12:
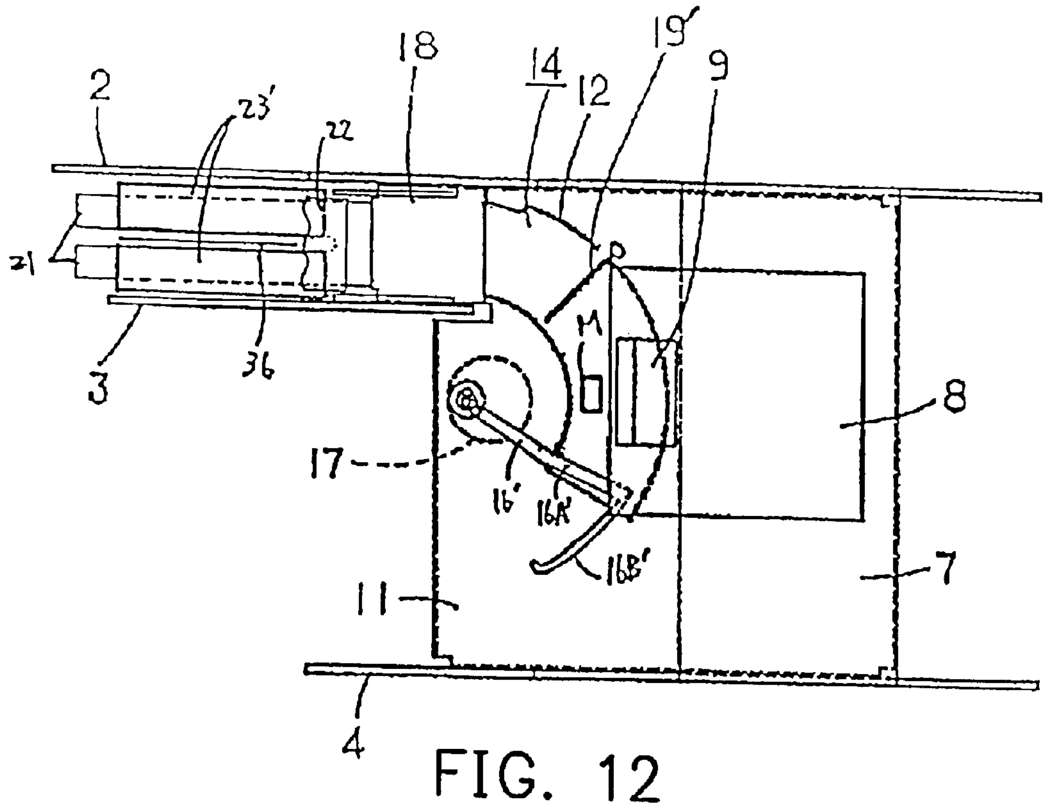
FIG. 12 through FIGS. 17A~17D various views of a tablet cutting apparatus according to the third embodiment of the present invention.

As shown in FIG. 12, the baffle plate 19' is mounted on the channel wall 12 by a spring (not shown) and is protruded towards the arc center of the channel wall 12. Namely, the baffle plate 19' is rotationally mounted on the channel wall 12.

Figure 13:
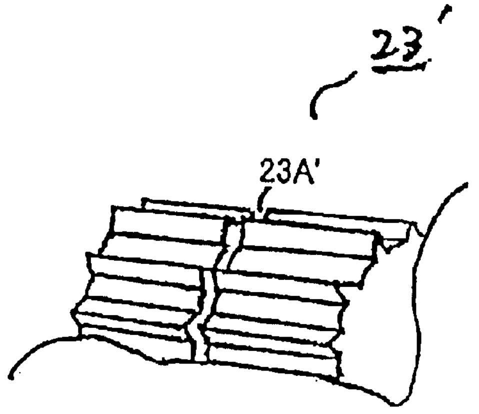

As shown, numeral 16' denotes the rotary arm, numeral 16A' is the pushing plate, numeral 16B' represents a restrict level of the baffle plate and numeral 23' is the retainer roller. FIG. 13 shows a portion of the retainer roller 23'. The retainer roller 23' can be made of rubber, for example and a rugged surface is formed on the roller 23'. The rugged surface of the roller 23' can further actually retain the tablet M. Namely, as the roller 23 of the embodiment shown in FIG. 2 rotates, the tablet M is conveyed. However, the rollers between the groove 23A are unnecessary to convey the tablet at the same timing. One of the roller may faster than the other, causing the tablet inclined.

As shown in FIG. 13, the rugged surfaces of rollers 23' is formed symmetrically with respect to the groove 23, which the rollers between the groove 23A' can rotate at the same timing such that the tablet is not inclined.

Next, the operation of the tablet conveying and cutting apparatus of the present invention is described in detail in accompany with FIGS. 12 through 17.

Figure 14:
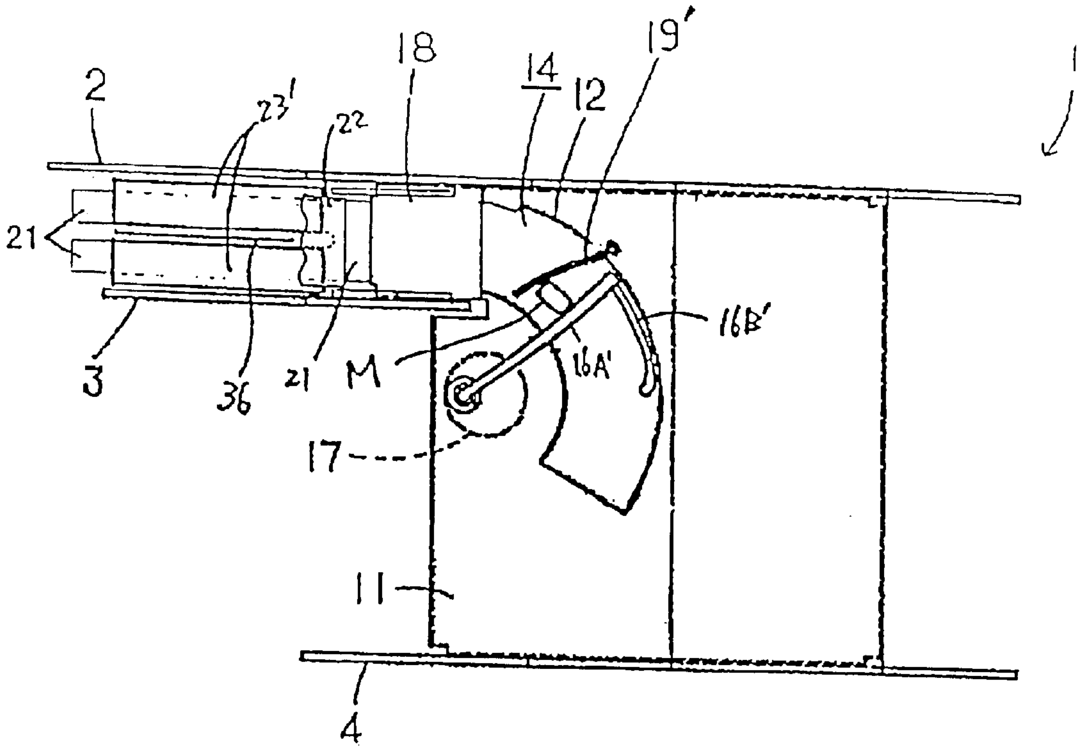
Figure 15:
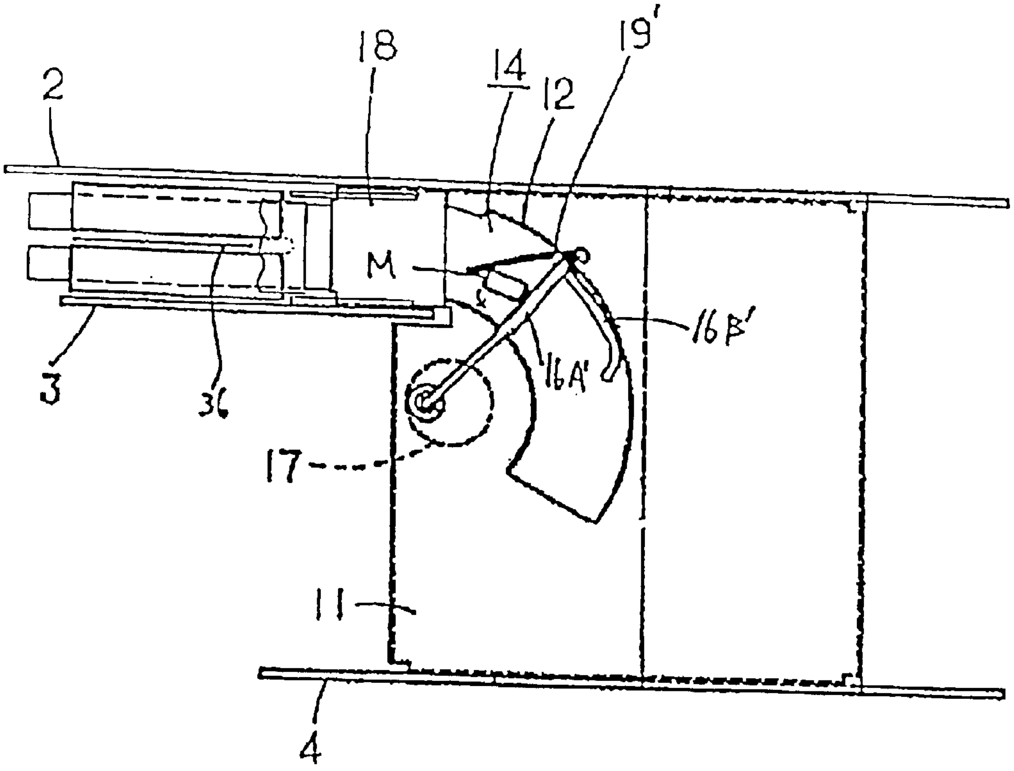

As the cutting operation begins, the rotary arm 16A' and the retainer plates 41, 42 are set to respective initial positions. Next, a first tablet is drained from the tablet feeder. The rotary motor 17 is driven such that the pushing plate 16A' pushes the tablet M. Afterwards, as shown in FIGS. 14 and 15, the tablet M is blocked by the baffle plate 19' such that the long side of the tablet M is arranged along the surface of the pushing plate 16A'.

Figure 16:
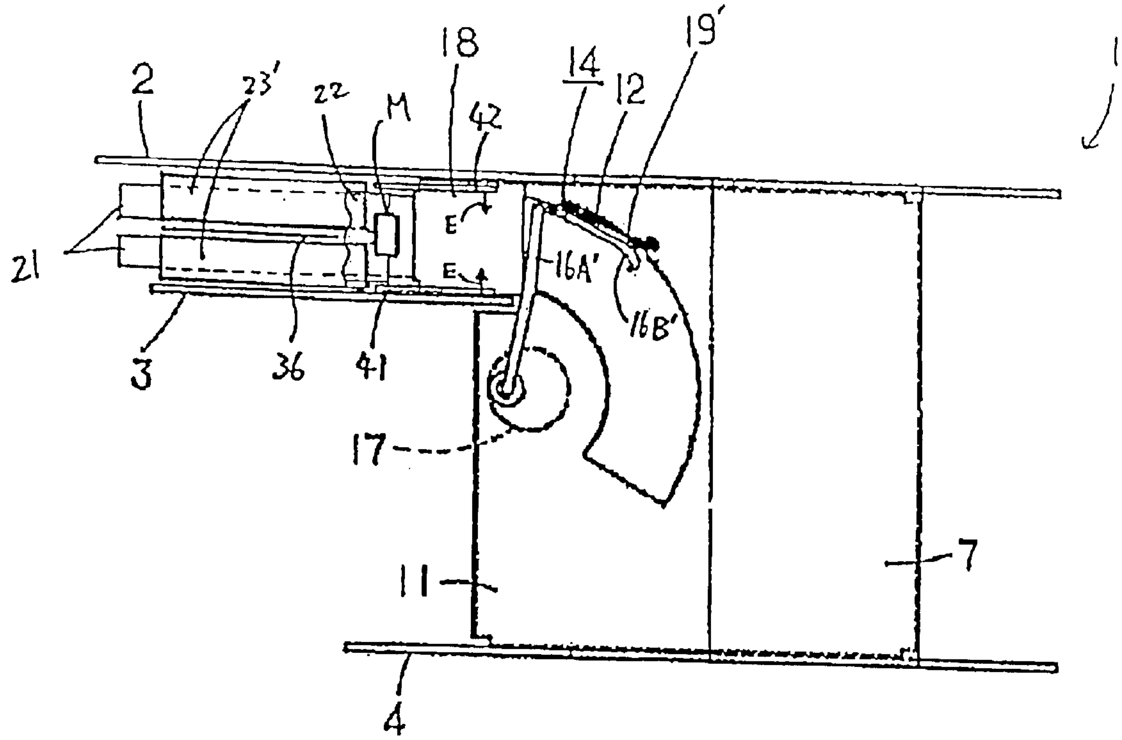

As shown in FIG. 16, the tablet M slides downwards on the oblique plate 18 and then blocked and stopped by the shutter 22. By the restrict level 16B', the pushing plate 16A' returns to its initial position and the baffle plate 19' also returns its initial position.

Figure 17A:
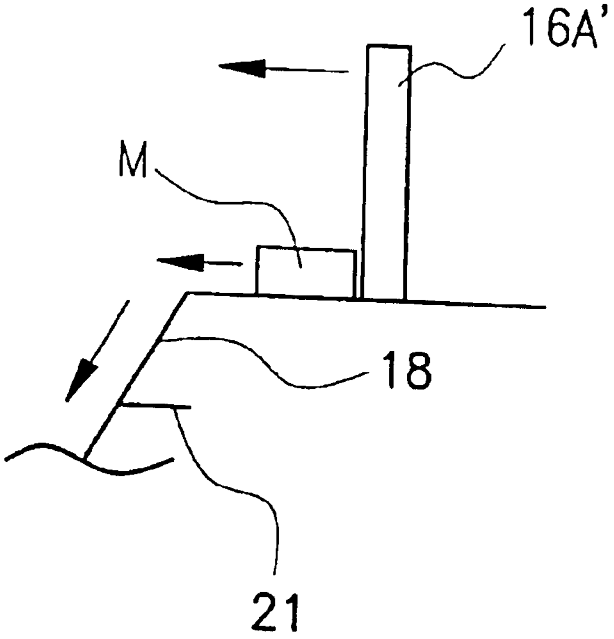
Figure 17B:
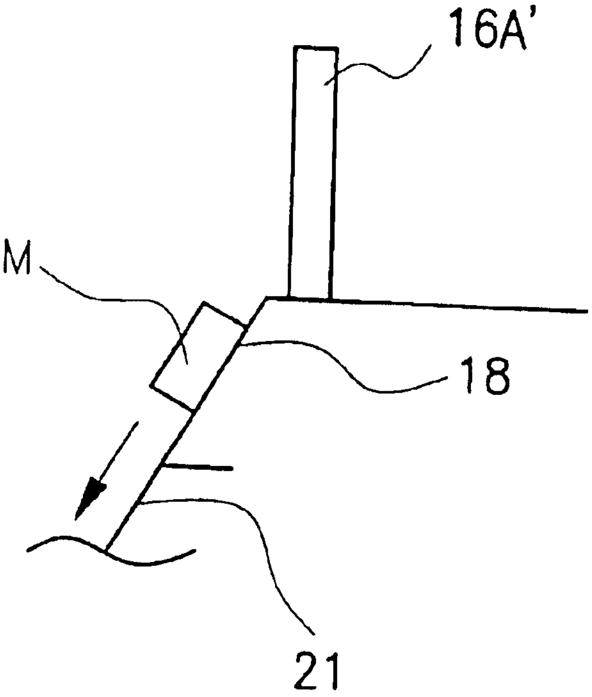
Figure 17C:
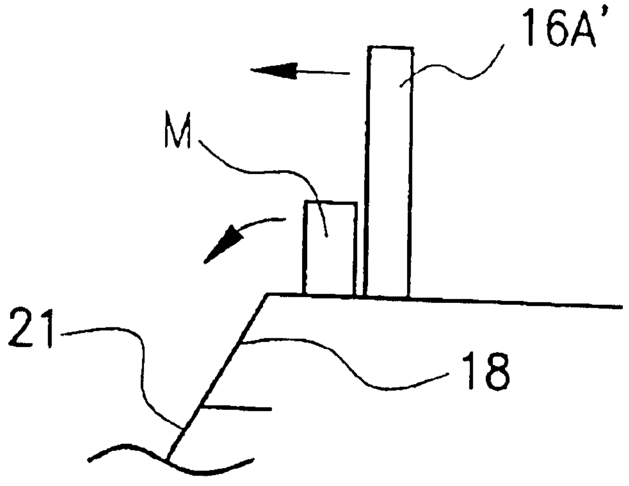
Figure 17D:
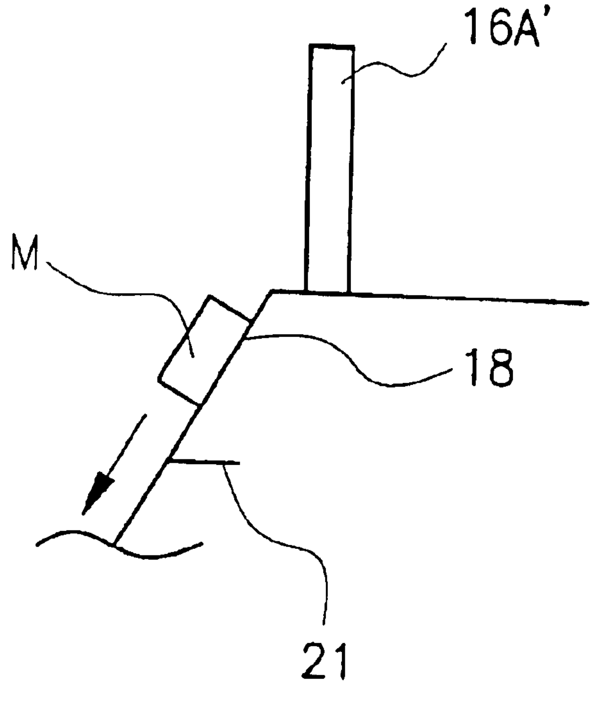

Next referring to FIGS. 17A and 17B, the function of the oblique plate 18 is described. As shown in FIGS. 17A and 17B, the tablet M slides downwards on the oblique plate 18. Furthermore, FIG. 17C shows that the tablet M in a standing position, which it is seldom occurred by chance. Even though under the situation shown in FIGS. 17C and 17D, the tablet M can be laid on and slid downwards the oblique plate 18.

Next, the shutter 22 is described in detail as followings.

The tablet M falls downwards the oblique plate 18 and the supporting resilient plate 21, and the tablet M may be inclined at this time. Therefore, the tablet M may be jammed with the retainer roller 23' when the inclined tablet is contact with the retainer roller 23'. Therefore, the shutter 22 is installed here for preventing jam from occurrence. The long side of the tablet M is thus aligned with the surface of the shutter 22 for collimating the position of the tablet M. Then, the shutter 22 is opened and the tablet M falls to contact with the retainer roller 23'. The tablet M is not jammed with the roller 23' because the falling distance of the tablet M is shortest.

The retainer plates 41, 42 then move towards the center (direction E shown in FIG. 16) such that the center of the tablet M is consistent with the location of the rotary blade 36. The retainer roller 23' is then driven and the tablet M is retained by the retainer roller 23' and the supporting resilient plate 21. Afterwards, the retainer plates 41, 42 are immediately separated (the opposite direction E shown in FIG. 16) and then returned to the initial position.

The tablet M is conveying by the retainer roller 23' and cut by the rotary blade 36. During the cutting operation, the force from the rotary blade 36 is applied to the roller 23' rather than the supporting resilient plate 21. Therefore, even if the rotary blade 36 rotates, the retaining force on the tablet M from the roller 23' and the supporting resilient plate 21 is not decreased and the tablet M can be hold stably.

In the foregoing embodiment, the rotary blade 36 is used for cutting the tablet M. However, a guillotine cutter, which operates up and down, can be used for cutting the tablet M. Moreover, during cutting the tablet M, powder may be occurred and spread everywhere. Therefore, a cleaning device for easily cleaning the tablet conveying and cutting apparatus can be installed.

FIGS. 18 to 24A–24C further show another embodiment of the present invention, in which the same numerals represent the same elements shown in FIGS. 1 through 17A–17D and their corresponding descriptions are omitted. From FIG. 20, a removable device can be only installed on the opposite side of the plate 2 for simplifying the structure and easily cleaning the apparatus.

Figure 18:
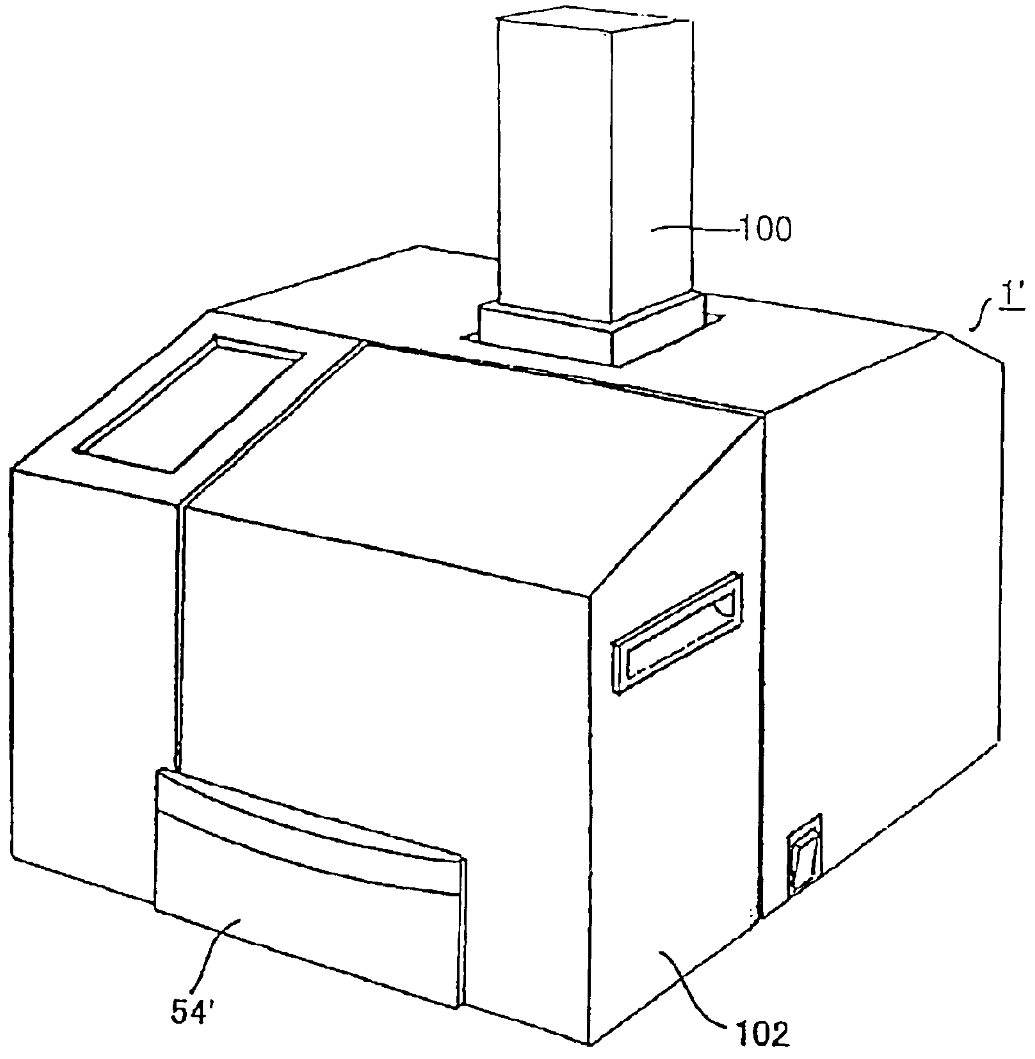
FIG. 18 a perspective view of a tablet cutting apparatus according to the fourth embodiment of the present invention.
Figure 19A:
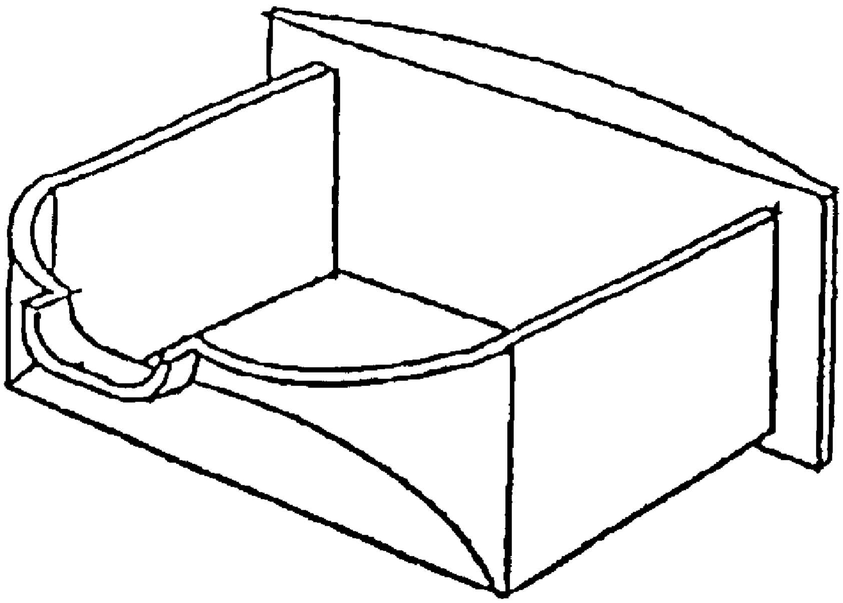
FIGS. 19A and 19B show the structure of a reception dish shown of the fourth embodiment of the present invention.
Figure 19B:
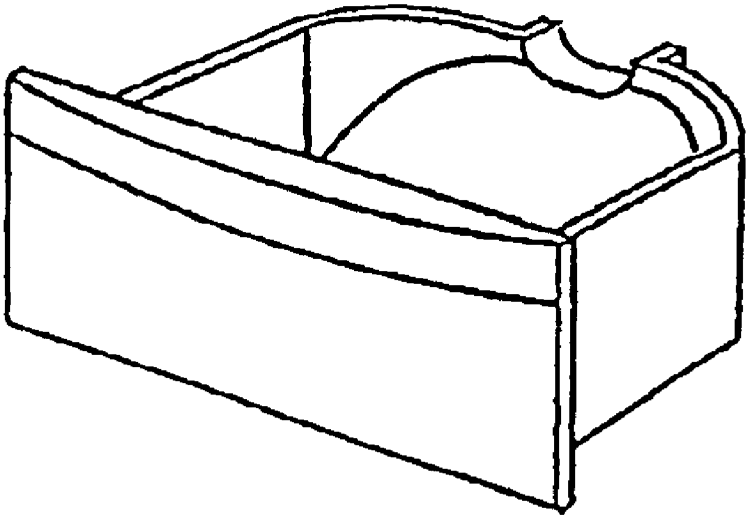

FIG. 18 is a perspective view of the tablet cutting apparatus of the present invention. Numeral 54' represents a reception dish for receiving the half-cut tablet. FIGS. 19A and 19B shows the structure of the reception dish 54'. Numeral 102 denotes the housing of the tablet cutting apparatus.

Figure 20:
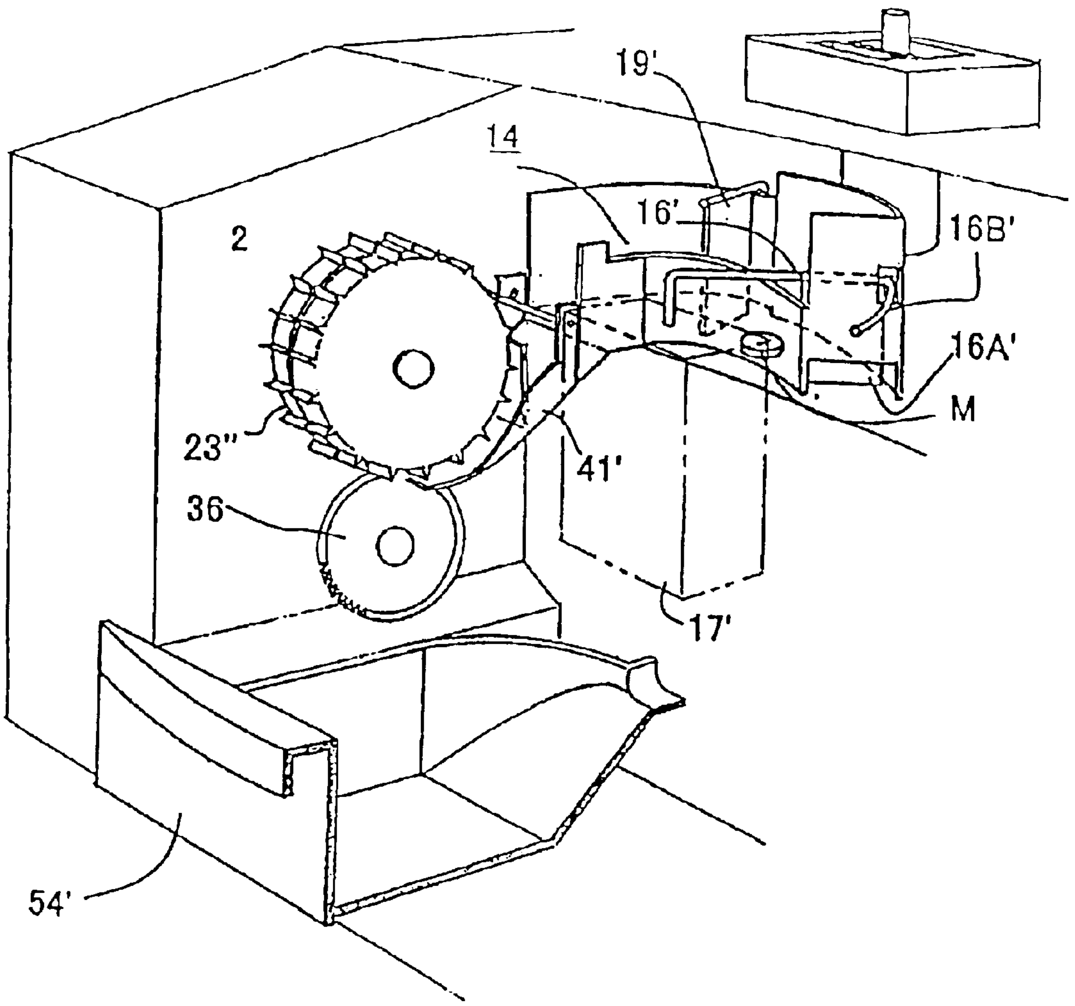
FIGS. 20–23 are internal views of the tablet cutting apparatus of the fourth embodiment of the present invention.

As shown in FIG. 20, numeral 19' is a baffle plate fixed by a resilient element. Numeral 16' is a rotary arm, 16A' is a pushing plate and 16B' is a restrict lever of the baffle plate 19'. Numerals 41', 42' represent retainer plates and numeral 23' represents a retainer roller. The retainer roller 23' is made of rubber and a rugged structure is formed symmetrically on the circumstance of the retainer roller 23'.

The operation of this embodiment is described in detail as followings. As the cutting operation begins, the rotary arm 16' and the retainer plates 41', 42' are set to respective predetermined locations. Tablets are then drained from the tablet feeder one by one. As shown in FIG. 20, the tablet falls on the channel 14.

Figure 21:
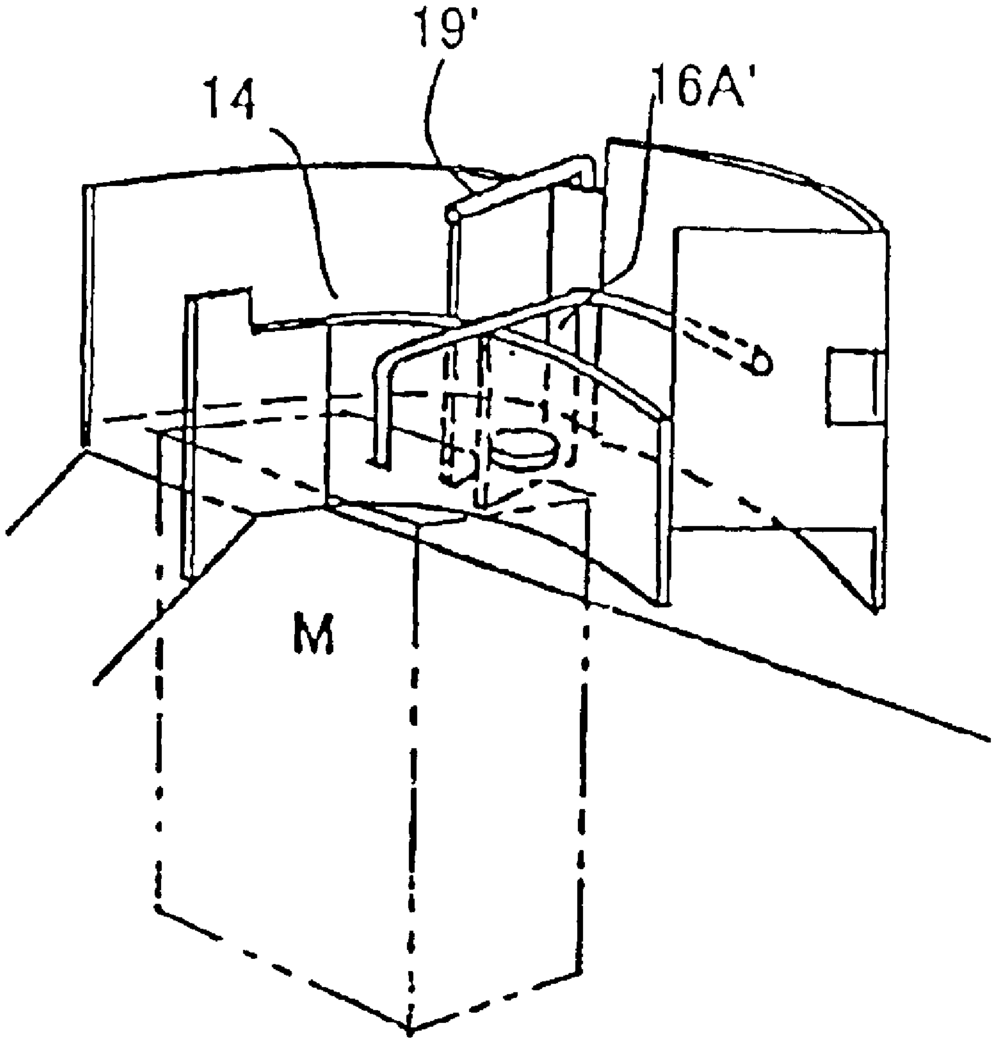

The rotary arm motor 17' is driven so that the pushing plate 16A' can push the tablet M to move forwards. Then, as shown in FIG. 21, the tablet M is in contact with the baffle plate 19'. If the tablet M is rectangular, the long side of the tablet M is then arranged along the surface of the pushing plate 16A'. In FIG. 21, a circular tablet is shown and therefore the position of the tablet M is not rearranged.

Figure 22:
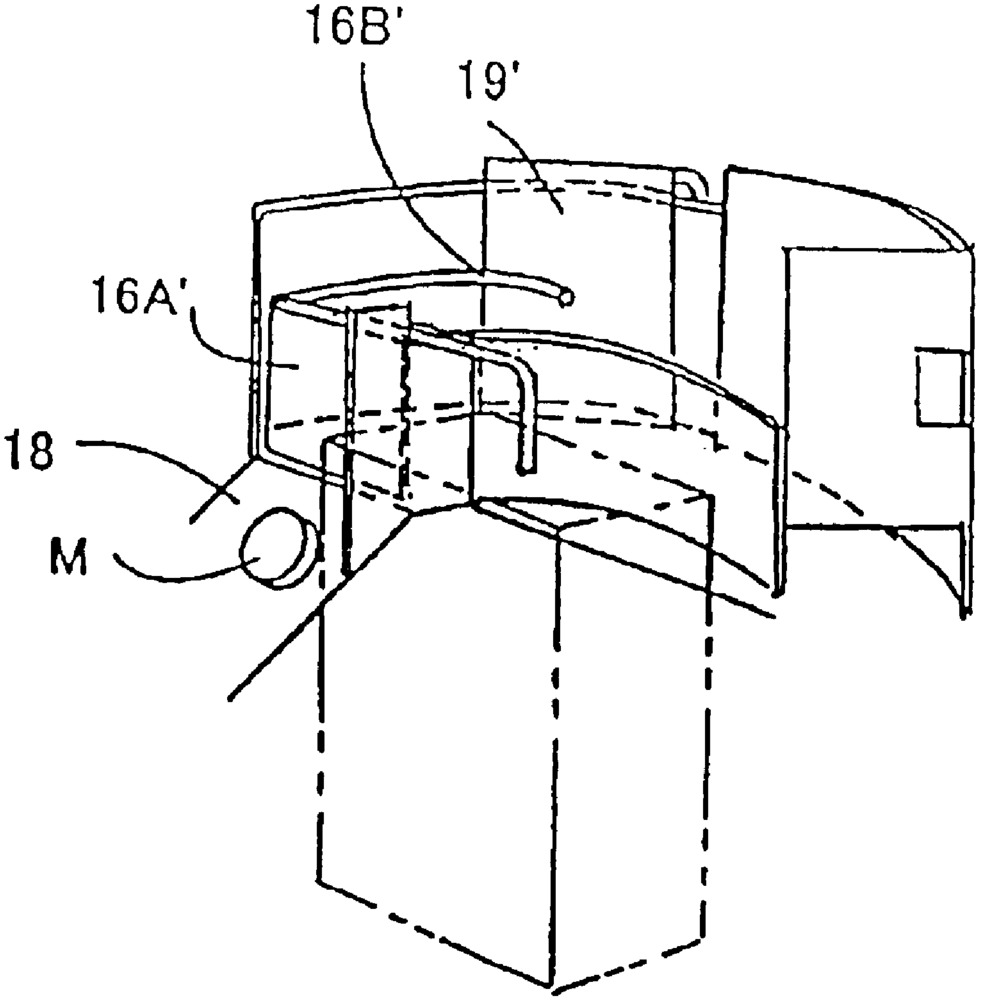
Figure 23:
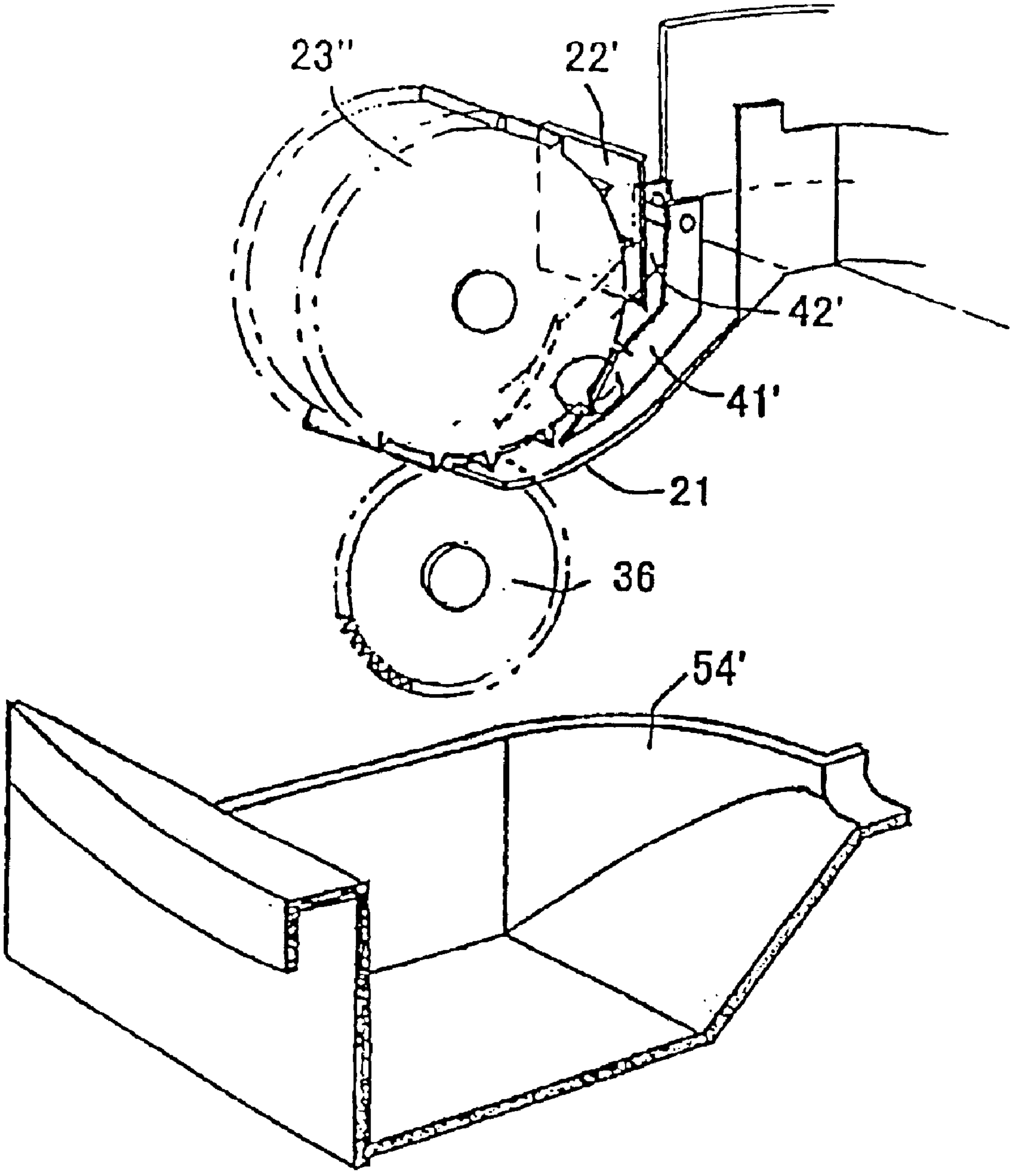
Figure 24:
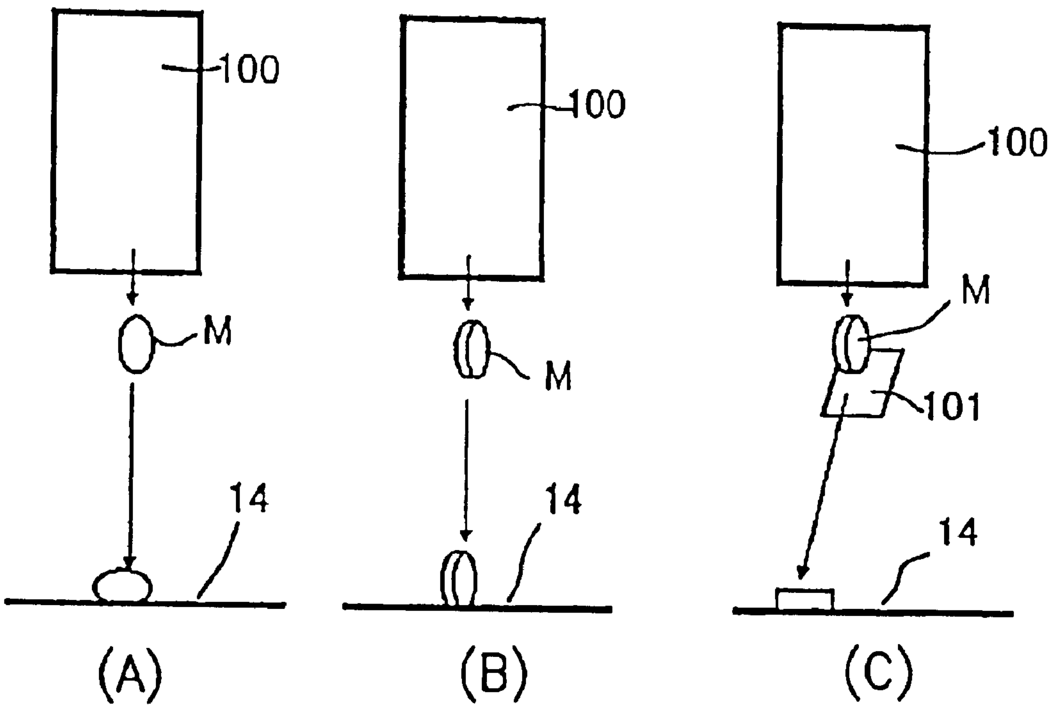
FIGS. 24A~24C show an improved structure of the tablet cutting apparatus of the fourth embodiment of the present invention.

Referring to FIG. 22, the tablet M is continuously pushed by the pushing plate 16A' move forwards and then to fall down along the oblique plate 18. At this time, the pushing plate 16A' returns to its original position by the restrict lever 16B' and the baffle plate 19' also returns to its original position.

The fallen tablet M is in contact with the shutter 22 and therefore blocked and stopped by the shutter 22. Then, the shutter 22 is opened and the tablet M falls to a contact position with the retainer roller 23'. Because the falling distance of the tablet M in this case is shortest, the tablet M is not jammed with the retainer roller 23'. The retainer plates 41, 42 then move towards the center such that the center of the tablet M is consistent with the location of the rotary blade 36.

As described in the third embodiment above, the retainer roller 23' is driven. When the tablet M is retained by the retainer plate 41' 42', if the retaining force from the retainer plate 41' 42' is small, the tablet M can be conveyed by the retainer roller 23' without any problem. However, if the retaining force from the retainer plate 41' 42' is large, the tablet M cannot be conveyed by the retainer roller 23'. Namely, the tablet M can be conveyed by the retainer roller 23' when the retaining force is weak and small. In contrast, if a motor with large torque is used to drive the retainer plates 41', 42', the retaining force becomes larger and therefore the retainer roller 23' fails to convey the tablet M.

The retainer plates 41', 42' return to the initial positions before the roller 23' is driven. However, as proceeded in this manner, the tablet M may be inclined at the beginning that the tablet M is retained by the roller 23' and the supporting resilient plate 21. Therefore, the retainer plates 41', 42' are controlled to separate slightly before the roller 23' is driven.

After the retainer plates 41, 42 are separated, the retainer roller 23' is driven. The guide distribution of the retainer plates 41, 42 is finished at the beginning that the tablet M is retained by the roller 23' and the supporting resilient plate 21. Therefore, the tablet M can be prevented from inclination.

Accordingly, the tablet M is not inclined and the retainer roller 23' can be used for conveying the tablet M. Afterwards, the tablet M is conveyed to the rotary blade 36 for cutting. The tablet M is equally cut in half and then fallen to the reception dish 54'.

Finally, how the tablet is fallen from the tablet case 100 is addressed.

As shown in FIG. 24A, the tablet M fallen from the tablet case 100 is laid on the channel 14. In case, as shown in FIG. 24B, a circular tablet may stand on the channel while the circular tablet is fallen from the tablet case 100. The standing tablet M is usually laid on the oblique plate 18 during falling down the oblique plate 18. However, it is possible that the standing tablet M keeps its position and slides down the oblique plate 18 to the shutter 22, although the possibility for this situation is very small. Therefore, a position changing plate is installed along the falling path of the tablet M for laying the tablet M on the channel 14.

According to the present invention, the position of the tablet M can be arranged or changed using a simple structure. Furthermore, even though the tablet is other than circular, the tablet can be correctly cut.

According to the present invention, the long side of the tablet is perpendicular to its moving direction, and the retainer device retains the ends of the long side of the tablet under such a state. While the tablet is located at a location corresponding to the rotary blade, the tablet is conveyed by a conveying device to the rotary blade for cutting. Therefore, such as an oval tablet or even though a non-circular tablet can be correctly modified its position and then conveyed to the rotary blade.

In addition, comparing with cutting by pressure, because the rotary blade 36 can cut the tablet M safely and credibly, the tablet M can be correctly and shape-irrelevantly cut in half.

In particular, according to claim 11, a position modification device is installed for modifying the long side of the tablet fallen from the arrange device to be perpendicular to the falling direction. Therefore, even though the long side of the tabled is not arranged to be perpendicular to its moving direction, the position modification device can further actually and correctly rearrange the position of the tablet.

Furthermore, the tablet is retained by the retainer roller and the supporting resilient plate and then moved to the location of the rotary blade. Because the force applied on the tablet during cutting is similar to the force applied to the rotary roller and is for setting the relative position of the rotary blade and the retainer roller, therefore no extra force is applied on the tablet or rotary blade. The tablet can be smoothly and correctly cut.

Furthermore, the position of the tablet can be arranged and changed using a simple mechanism. In addition, the tablet can be correctly cut even though the tablet is other than circular.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A tablet conveying apparatus for adjusting a position of a tablet, comprising:

an arranging device for arranging a long side of the tablet to be perpendicular to the tablet's moving direction by moving the tablet for a first predetermined distance;

an oblique plate, coupled to the arranging device, for receiving the tablet and then making the tablet fall a second predetermined distance;

a supporting resilient plate, connected to a lower end of the oblique plate; and a pair of retainer rollers, located above the supporting resilient plate and the pair of the retainer rollers being concentrically disposed with a predetermined groove, wherein the fallen tablet is resiliently retained by the retainer rollers and the supporting resilient plate.

* * * * *